Figure 10:
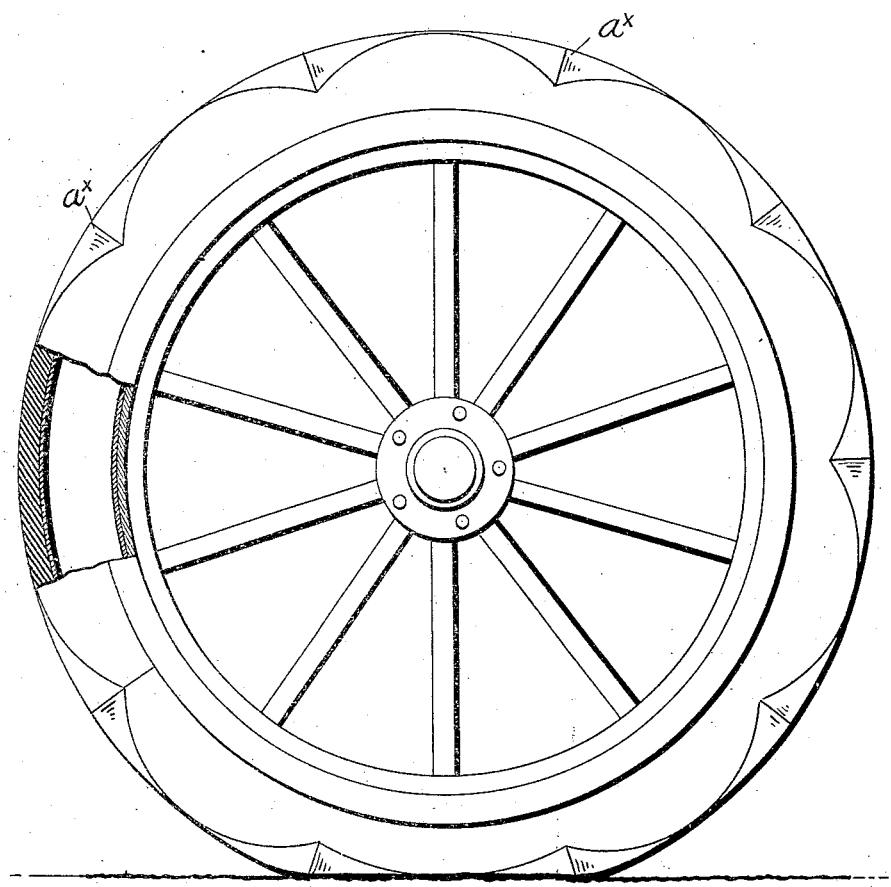

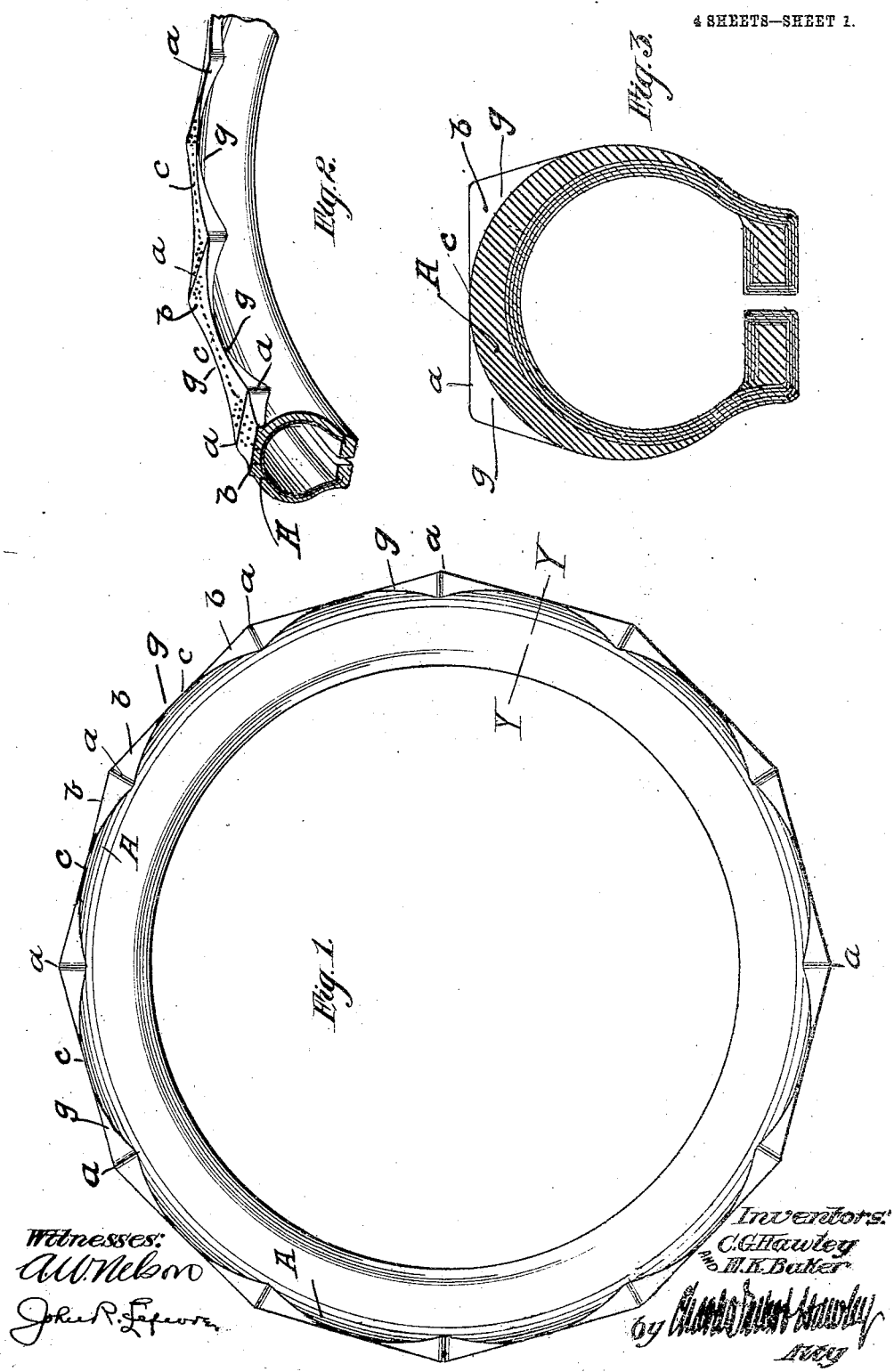

C. G. HAWLEY & E. K. BAKER.
TREAD FOR PNEUMATIC TIRES.
APPLICATION FILED APR. 11, 1908.
903,715.  Patented Nov. 10, 1908.
4 SHEETS—SHEET 2.
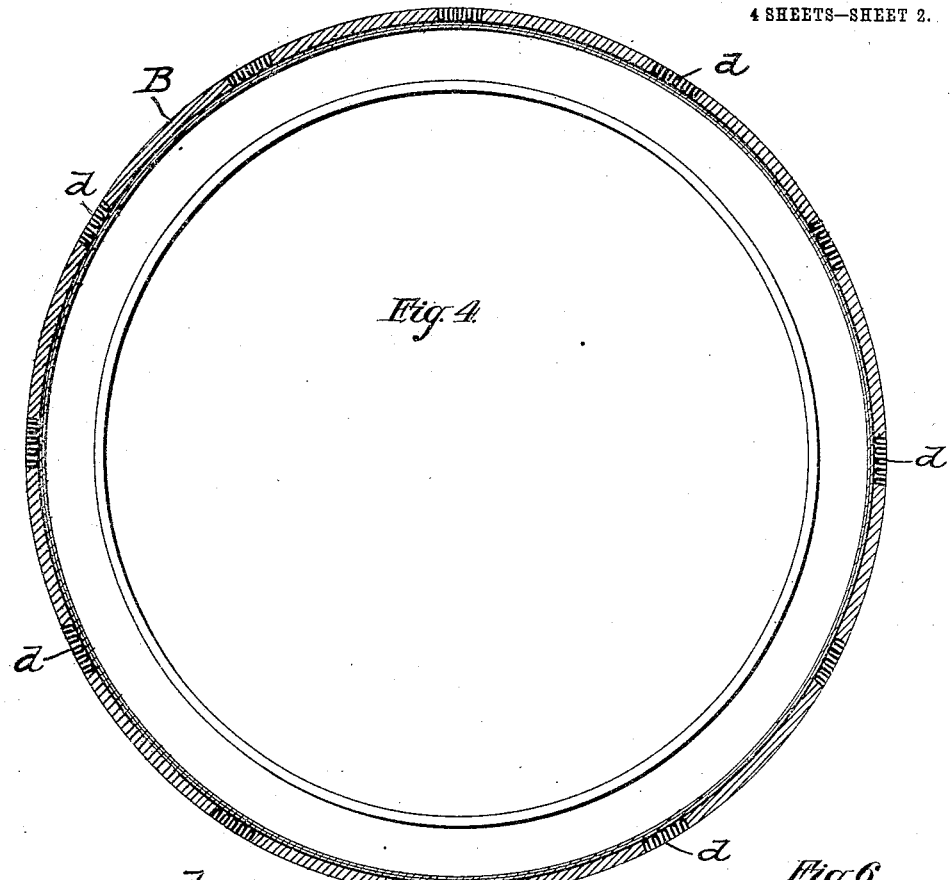
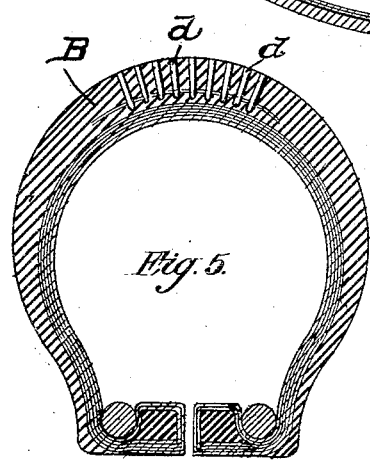
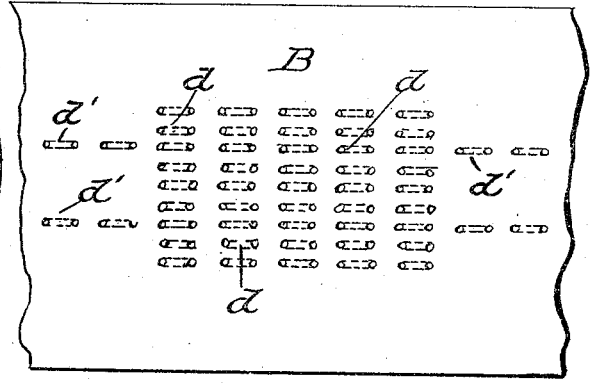
Witnesses:
Inventors:
C. G. Hawley
and E. K. Baker
by Atty.

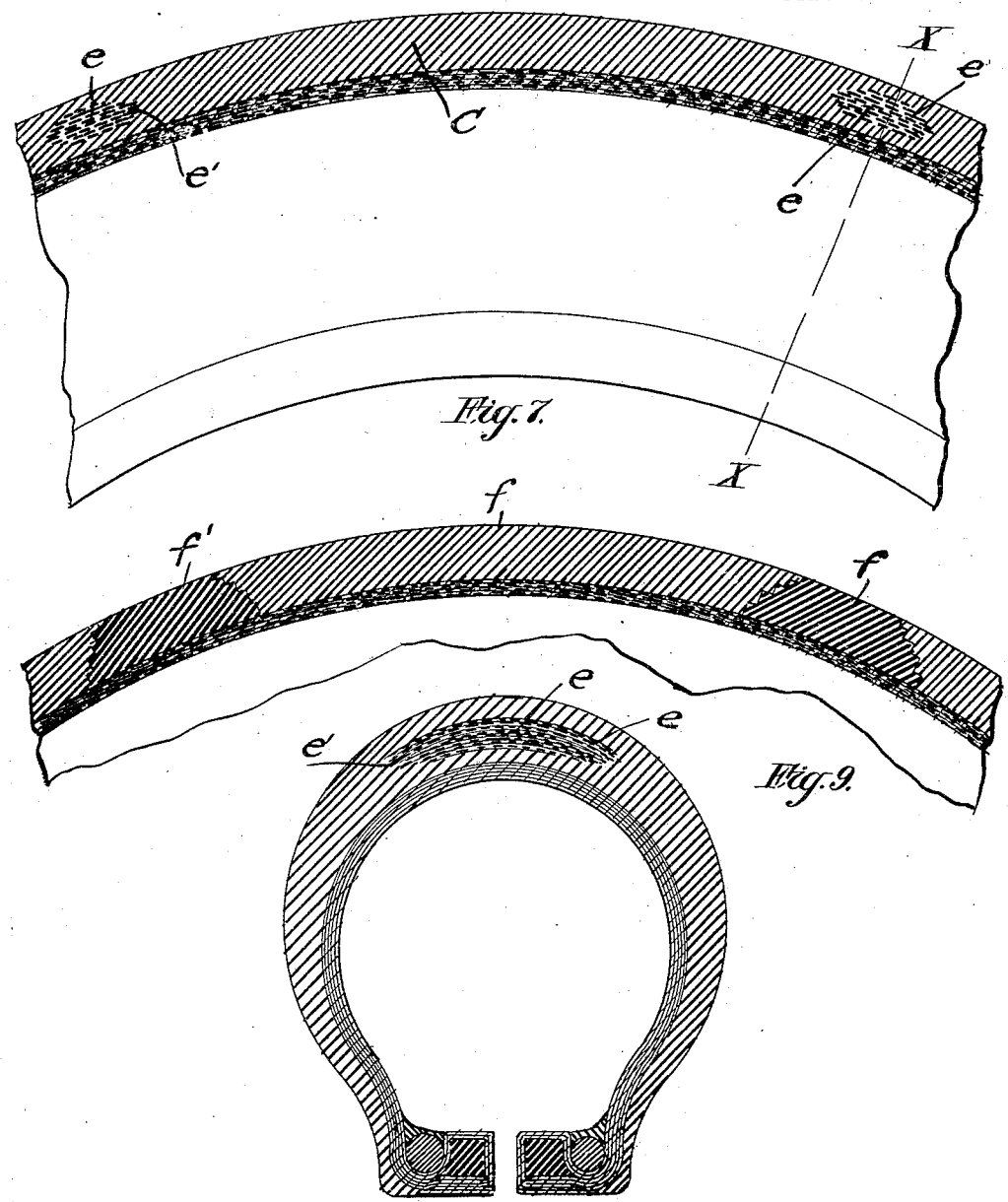

C. G. HAWLEY & E. K. BAKER.
TREAD FOR PNEUMATIC TIRES.
APPLICATION FILED APR. 11, 1908.

903,715.

Patented Nov. 10, 1908.

4 SHEETS—SHEET 4.

UNITED STATES PATENT OFFICE.

CHARLES GILBERT HAWLEY AND ERLE K. BAKER, OF CHICAGO, ILLINOIS.

TREAD FOR PNEUMATIC TIRES.

No. 903,715.  Specification of Letters Patent.  Patented Nov. 10, 1908.

Application filed April 11, 1908. Serial No. 426,496.

*To all whom it may concern:*

Be it known that we, CHARLES GILBERT HAWLEY and ERLE KING BAKER, both citizens of the United States, and residents of Chicago, Cook county, Illinois, have invented certain new and useful Improvements in Treads for Pneumatic Tires, of which the following is a full, clear, and exact description, such as will enable others skilled in the art to which it appertains to make and use the same:

Our invention relates to improvements in pneumatic or cushion tires, and has special reference to improvements in the treads of such tires.

The object of the invention is to secure the advantages of the well known tire chains and anti-skidding devices, which are commonly applied to the peripheries of pneumatic tires, while, at the same time, avoiding the disadvantages of such devices or appliances. To this end, we form, construct or shape a pneumatic tire in such manner that its periphery presents a plurality of suitably spaced projections, or, in lieu thereof, firmer or less compressible portions, whereby the pressure or grip of the tire upon the road is rendered variable and skidding or slipping is prevented.

Our invention also resides in various novelties, constructions, forms and shapes hereinafter typified and described and particularly pointed out in the appended claims.

The invention will be more readily understood by reference to the accompanying drawings, forming a part of this specification and in which:—

Figure 1, is a side elevation of a tire embodying our invention; Fig. 2, is a perspective view or section of a tire of the general form shown in Fig. 1, containing groups and lines of metallic parts; Fig. 3, is an enlarged cross section of the tire; on the line *y—y* of Fig. 1; Fig. 4, illustrates a modification of our invention wherein groups of metallic parts are employed in the tread portion of the tire; Fig. 5, is an enlarged sectional view of the tire shown in Fig. 4; Fig. 6, is a similarly enlarged view, showing the surface of the tread or periphery of the tire of Fig. 4; Fig. 7, illustrates a further modification of our invention, wherein we employ relatively incompressible sections arranged at intervals in the tread portion of the tire; Fig. 8, is a sectional view on the line X—X of Fig. 7; Fig. 9, shows still another form of the invention wherein the tread is composed of sections of rubber composition in different conditions of compressibility and elasticity; and, Fig. 10, illustrates a modified form of the tire shown in Fig. 1.

Our invention is not exhaustively illustrated in these drawings; they, however, serve to show several ways of carrying out the invention, and brief perusal thereof discloses that which we wish to be clearly understood, namely,—that the invention is capable of embodiment in many different forms and is not closely limited to the specific constructions herein shown and described.

The tire chains and irons that are in general use are in all cases applied to the outside of the tire, and in effect form teeth thereon; which, though they are pressed or embedded in the rubber tread of the tire at instants of contact with the road, nevertheless increase the traction and grip of the tire upon the road. These chains or irons extend across the tread at intervals thereon, the distance between them corresponding substantially to the length of the longitudinal line of normal contact between the inflated tire and the road surface. A very small number of cross chains serve to prevent the slipping or skidding of the wheel. They, however, shorten the life of the tire whereon they are used and are also strongly objected to by municipal authorities on the ground that they destroy the surface of the pavement; in fact the use of such devices is prohibited in many cities for the latter reason.

Our novel tire tread serves the same purpose as the chains or irons above referred to and are not destructive and do not tear up the road or pavement. Our tire comprises portions that may be described as of regular construction and other portions spaced or alternated therewith and which by reason of their greater thickness or stiffness, or because either non-compressible or less compressible material is embedded therein, act after the manner of teeth or projections, so that the tractive effort or grip of the tire is rendered intermittent or varying, such thicker, stiffer, non-compressible or less compressible portions or parts being spaced around the tread at distances substantially corresponding to, or exceeding the length of the line, or extent, of normal contact between the inflated tire and the road.

Figs. 1, 2 and 3 illustrate a tire, the tread A, of which varies in thickness or bulk at regular intervals, presenting thick, transversely extended portions a, and other portions b, b, of diminishing thickness, the tread at points c, merging into what may be termed an ordinary cross section. The sections of the tread, considered as extending from point a to point a, may be tangential to the normal periphery and thus give the tire a non-circular or polygonal appearance, as in Fig. 1; or, obviously the thick portions a may be limited or confined to the sides of the tire and thus kept within the normal circular or common outline of the tire, as shown in Fig. 10.

The tire B which is depicted in Figs. 4 to 6 is the substantial equivalent of the other, but it is distinguished therefrom by groups of metallic parts, staples, coils, rivets, or the like d, embedded at intervals in the periphery of the tire. Thus in Figs. 1, 3 and 10, we have shown a tire having a tread which is wholly composed of rubber, whereas in Figs. 2, 4, 5 and 6, we disclose a tire having a compound tread, partly composed of metal and principally composed of rubber.

A further understanding of the scope of our invention is secured from Figs. 7 and 8, wherein neither visible projections nor metal parts are used, but instead the tread C of the tire is formed with or contains small bodies e of less compressible material so embedded and incorporated therewith as to be integral parts thereof, and yet vary the flexibility of the tread at intervals in its circumference, which we find essential to the accomplishment of our purpose, in such a tire. We preferably form these small bodies, lumps or transverse fillers e, from material which is readily incorporated with the mass of the tread rubber by vulcanization, such, for example, as ordinary friction cloth or fabric. In forming the transverse fillers we prefer to make them of pieces of fabric e' of different sizes, so that the edges of each body or filler e are relatively rounded or tapered, sharp lines of severance or cleavage being thus avoided. It should be here mentioned that in actual practice these layers of fabric e' may be placed in position upon the several layers of rubber as the latter are applied in building up the tread.

Fig. 9, illustrates another modification of our invention wherein the tread D of the tire is wholly composed of rubber and yet has no visible projections, the desired condition and effect being secured by making the tread of alternate long and short rubber sections f and f' of different degrees of flexibility.

A tread of the kind illustrated in Figs. 1, 2, 3 and 10 in either circular or non-circular form, is particularly efficient in the prevention of slippage and skidding; by reason of its varying action when rolling upon the road. And it is also most efficient on muddy roads, for the projections extend laterally from what may be termed the normal surface or sides of the tire and therefore present lateral cavities g, so that the engagement between the road and the tire not only varies longitudinally but laterally or transversely as well, with the result that the tire firmly interlocks with the muddy surface of the road.

In Figs. 2, 4, 5 and 6, we have illustrated metal parts d like unto those appearing in Letters Patent No. 865,288, granted to us September 3, 1907, but as inferred from the foregoing, metallic or hard pieces of various kinds and shapes may be thus embedded in the tread.

In addition to the patches or groups of staples d thickly set, best shown in Fig. 4, we preferably provide the intermediate or more flexible sections of the tire with one or more lines d' of said staples, in order that slippage of the tire shall be wholly prevented, as illustrated in Fig. 6. The presence of one or more rows or lines of metal parts, extending entirely around the tire in this manner, does not detract from the effectiveness of the less compressible flexible or elastic sections or portions, formed by the introduction of the transversely extended groups or lines. It will be obvious that the tire may be made with one, or more longitudinal rows of metal inserts and also that single transverse rows arranged at intervals will, and do, serve the full purpose of our invention, notwithstanding which fact, we prefer that each group shall comprise several transverse rows of such metal parts.

In special cases we construct tires of the character shown in Figs. 1 and 10, with both lateral or thickened portions and metallic parts as indicated by the dots upon the tread surface in Fig. 2.

The word "rubber" as herein and hereinafter employed, is intended to define and include various gutta percha compositions and equivalent substances or compositions.

Having thus described our invention, we claim as new and desire to secure by Letters Patent:—

1. A pneumatic tire having a tread portion composed of alternated portions differing in elasticity, the portions of least elasticity being spaced about the tread at distances substantially corresponding to the length of the longitudinal line of normal contact between the tire tread and the road surface, substantially as described.

2. A pneumatic tire having a tread portion composed of alternated portions differing in flexibility, the portions of least flexibility being spaced about the tread at distances substantially corresponding to the length of the longitudinal line of normal contact between the tire tread and the road surface, substantially as described.

3. A pneumatic tire having a circumferential tread portion of rubber formed to present, at circumferential intervals substantially coextensive with the line of normal contact between the tire and the road, portions of less compressibility than the other portions of the tread, substantially as described.

4. A pneumatic tire having a rubber tread varying in flexibility at circumferential intervals which are substantially coextensive with the length of the line of normal contact between the tire and the road, and presenting corresponding lateral projections and reëntrant lateral cavities, substantially as described.

5. A pneumatic tire having its tread provided with integral lateral projections and containing lateral cavities between such projections, said projections being spaced around the tread at distances substantially corresponding to the length of the longitudinal line of normal contact between the tire and the road, substantially as described.

6. A pneumatic tire having a circumferential tread portion of rubber and containing laterally extensive groups of metallic parts, which present their ends at the surface of the tread, said groups being spaced around the tread at distances substantially corresponding to the length of the longitudinal line of normal contact between the tire and the road, substantially as described.

7. A pneumatic tire having a circumferential tread portion of rubber containing a circumferential row of metallic parts and a plurality of transversely extensive groups of such parts, said groups being spaced around the tread at distances substantially corresponding to the length of the longitudinal line of normal contact between the tire tread and the road, substantially as described.

8. A pneumatic tire having a circumferential tread portion of rubber containing transversely extensive portions spaced at intervals substantially corresponding to the longitudinal line of normal contact between the tire tread and the road, as and for the purpose specified.

9. A pneumatic tire having upon its tread portion a plurality of circumferentially spaced integral projections and reëntrant lateral cavities, and also provided with spaced groups of metallic parts embedded therein, said groups and projections being spaced to correspond with the length of the line of normal contact between the tire and the road, substantially as described.

In testimony whereof, we have hereunto set our hands, this 28th day of March, 1908, in the presence of two subscribing witnesses.

CHARLES GILBERT HAWLEY.
ERLE K. BAKER.

Witnesses:
JOHN R. LEFEVRE.
M. SIMON.